United States Patent

Lin

[15] 3,639,031
[45] Feb. 1, 1972

[54] HOLOGRAM COPYING FOR RECONSTRUCTION OF AN ABERRATION-FREE WAVEFRONT AT A WAVELENGTH DIFFERING FROM THE COPYING WAVELENGTH

[72] Inventor: Lawrence H. Lin, Chatham, N.J.

[73] Assignee: Bell Telephone Laboratories, Incorporated, Murray Hill, N.J.

[22] Filed: Sept. 24, 1970

[21] Appl. No.: 75,202

[52] U.S. Cl. ................................. 350/3.5, 355/2
[51] Int. Cl. ............................................ G02b 27/00
[58] Field of Search ............... 350/3.5; 96/27 H; 340/5 H; 181/.5; 355/2

[56] References Cited

OTHER PUBLICATIONS

Gerritsen, Applied Physics Letters, Vol. 10, No. 9, May 1967, pp. 239–241

Sherman, Applied Optics, Vol. 6, No. 10, Oct. 1967, pp. 1749–1753

Primary Examiner—David Schonberg
Assistant Examiner—Ronald J. Stern
Attorney—R. J. Guenther and Arthur J. Torsiglieri

[57] ABSTRACT

A first thick hologram of the wave front from an object is formed at a first wavelength to which a first hologram-recording medium is sensitive. A second hologram is recorded on a second recording medium sensitive to a second wavelength by placing the second recording medium adjacent the first and illuminating the first hologram with radiation at the second wavelength. This second hologram can then be illuminated with radiation of the first wavelength to reconstruct with minimum aberration the wave front associated with the object recorded on the first hologram.

5 Claims, 3 Drawing Figures

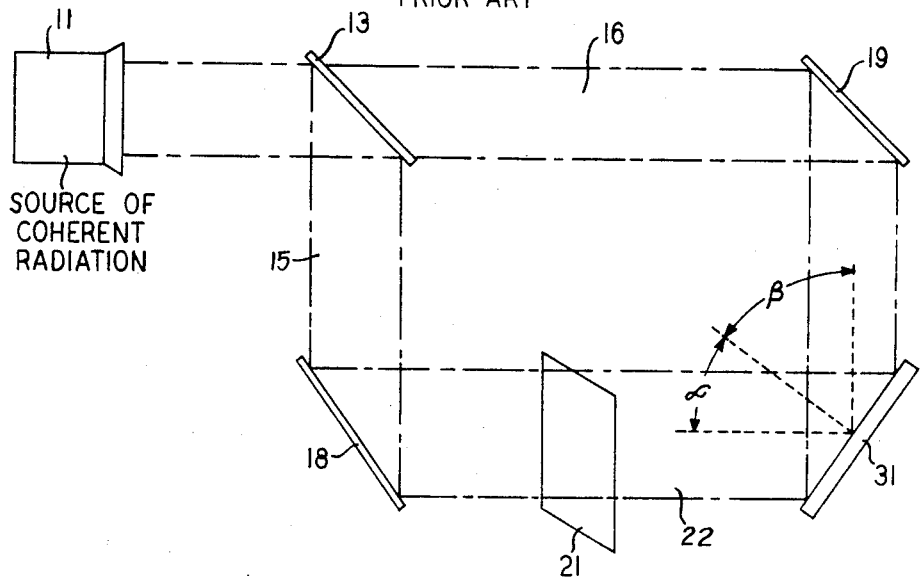
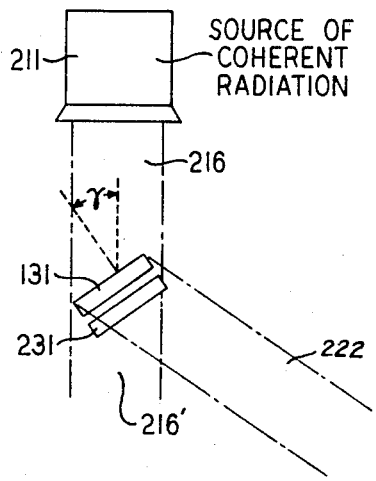
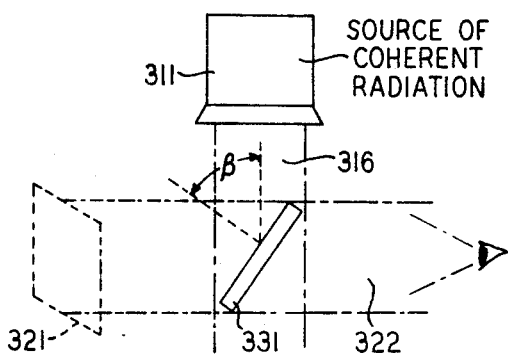
INVENTOR
L. H. LIN
BY Francis E Morris
ATTORNEY 3,639,031

HOLOGRAM COPYING FOR RECONSTRUCTION OF AN ABERRATION-FREE WAVEFRONT AT A WAVELENGTH DIFFERING FROM THE COPYING WAVELENGTH

BACKGROUND OF THE INVENTION

This concerns holographic recordings and in particular a method for reducing certain aberrations that otherwise result when the wave front that illuminates a hologram for reconstruction differs from the reference wave front used in forming the hologram.

When an object is illuminated, it modulates the illuminating beam to form a beam of radiation that carries information representative of the object. A record, called a hologram, can be made of the phase and amplitude of this information-bearing beam by interfering on a recording medium, such as a photographic plate, the wave fronts of the information beam and a phase-related reference beam. If the thickness of the hologram-recording medium is small in relation to the spacing of the interference fringes produced by the interfering beams, the hologram can be regarded as a thin hologram. On the other hand, if the thickness of the hologram recording medium is greater than the spacing of the interference fringes, the depth of the hologram must be taken into account. Such a hologram is called a thick hologram or a volume hologram.

When a hologram is illuminated with a replica of one of the two beams that were used in forming the hologram, the illuminating beam is diffracted to reconstruct in the first order a replica of the other beam. Ordinarily, the illuminating beam is a replica of the reference beam and the reconstructed beam is then a replica of the information-bearing beam. Hence, an image of the object recorded in the hologram can be viewed in the reconstructed information beam. When the diffracted, or reconstructed, beam emerges from the hologram on the side opposite that on which the illuminating beam was incident, the hologram is called a transmission hologram. When the diffracted beam emerges on the same side as the illuminating beam, the hologram is termed a reflection hologram. In addition to the diffracted beam, there is also projected from the hologram a transmitted beam containing that part of the incident illuminating beam that is not diffracted by or absorbed by the hologram.

When a hologram is illuminated with a beam that is not a replica of one of the beams used in forming the hologram, reconstruction can be made in certain instances. Thus, if the hologram is a thin hologram, reconstruction can be made even if the angle at which the illuminating beam is incident on the hologram is different from that at which the reference beam was incident on the hologram recording medium when the hologram was being formed. Reconstruction can also be effected if the wavelength of the illuminating beam differs from the wavelength of the reference beam. If, however, the hologram is a thick hologram, the reconstruction process is governed by the Bragg condition that $\sin \theta_1 = n \cdot \sin \theta_2 = \lambda/2d$ where $\theta_1$ is the angle in air that both the illuminating beam and the diffracted beam make with the recorded interference fringes, $\theta_2$ is the same angle in the recording medium, $n$ is the average refractive index of the recording medium, $\lambda$ is the wavelength of the Bragg-diffracted radiation in free space, and $d$ is the spacing between adjacent fringes. Thus, if the wavelength of the reconstructing beam differs from that of the reference beam, there must also be a corresponding difference in the angles at which these beams are incident on the hologram recording medium.

Although hologram reconstruction can be effected as detailed above at a wavelength or an angle different from that at which the hologram is formed, it has long been known that such a reconstruction ordinarily introduces aberrations into the reconstructed beam. See, for example, R. W. Meier, "Magnification and Third-Order Aberrations in Holography," Journal of the Optical Society of America, Vol. 55, p. 987(1965). Nevertheless, it is often desirable to reconstruct the hologram at a different wavelength or angle in order to take advantage of properties of the recording medium. FOr example, for many applications it is desirable to record a thick hologram in a recording material that has a high-diffraction efficiency and a very low absorption loss. One of the best such materials with these properties is dichromated gelatin. However, dichromated gelatin is sensitive to only blue or ultraviolet radiation and is not sensitive to the longer wavelengths produced by the more readily available lasers, such as the Helium-Neon laser, or the more powerful lasers, such as the Ruby laser. Consequently, with previously available techniques, it has not been possible to form a hologram in dichromated gelatin with green or red radiation; and when a hologram was formed in dichromated gelatin with blue or ultraviolet radiation, and subsequently illuminated with red or green radiation, the reconstructed wave front from the hologram, and hence the reconstructed image, was found to contain aberrations.

SUMMARY OF THE INVENTION

Accordingly, it is an object of this invention to facilitate hologram recording.

It is a further object of this invention to facilitate the formation and the reconstruction of holograms at different wavelengths and electromagnetic radiation.

It is still another object of this invention to facilitate the recording of thick holograms no matter what the wavelength sensitivity of the hologram-recording medium. These and other objects and features of may invention are attained by forming a first thick hologram at a first wavelength to which a first hologram-recording medium is sensitive and then forming from the first hologram a second hologram on a second recording medium sensitive to a second wavelength. To record the second hologram at this second wavelength, the first hologram is illuminated with radiation of the second wavelength at an angle of incidence that is related by the Bragg condition to the angle of incidence of the reference beam used in forming the first hologram. The second hologram is formed by placing a second recording medium sensitive to the second wavelength immediately adjacent the first hologram. This second hologram can then be illuminated with radiation of the same wavelength and angle of incidence of the reference beam used in forming the first hologram to reconstruct with minimum aberration the wave front associated with the object recorded on the first hologram.

BRIEF DESCRIPTION OF THE DRAWING

These and other objects and features of the invention will become more readily apparent from the following detailed description of the drawing in which:

FIG. 1 is a schematic representation of illustrative apparatus used in the prior art;

FIG. 2 is a schematic representation of illustrative apparatus used in the practice of the invention; and FIG. 3 is a schematic representation of illustrative apparatus used to illuminate a hologram formed with the apparatus of FIG. 2.

DETAILED DESCRIPTION

FIG. 1 illustrates typical prior art apparatus used in forming a hologram. This apparatus comprises a source 11 of coherent radiation, an object 21 and a recording medium 31. As shown here, object 21 is a transparency, but it is well known that the object might also be a three-dimensional object that is not transparent. Recording medium 31 might be a high-resolution photographic film which is sensitive to radiation having a particular range of wavelength.

The apparatus of FIG. 1 also includes a beam splitter 13 to divide a beam 12 of coherent radiation into two phase-related beams. One of these beams, which may be termed object beam 15, is reflected by a mirror 18 through object 21 toward recording medium 31. After transmission through object 21, this beam may be termed information beam 22. The other beam, which may be termed reference beam 16, is reflected by a mirror 19 onto recording medium 31. Information beam 22 is incident on recording medium 31 at a median angle $\alpha$ to the normal of the recording medium; and reference beam 16 is incident on the recording medium at a median angle $\beta$ to its normal.

Because beams 22 and 16 are phase related, they interfere at recording medium 31 to form a set of interference fringes and these interference fringes are recorded as a hologram on medium 31.

As is well known, an image of object 21 can be reconstructed from the hologram on recording medium 31 simply by illuminating it with a beam of radiation that is similar to beam 16. Ordinarily, this reconstructing illumination has the same wavelength and incident angle as that of beam 16. If it does not, aberrations are usually observed in the reconstructed image of object 21.

I have devised a way to eliminate virtually all such aberrations that result when the hologram is illuminated at a wavelength and angle different from those of the reference beam used to form the hologram. First, for a reason that will be discussed below, a thick hologram is formed following the prior art method described in conjunction with FIG. 1. This hologram is recorded using a reference beam having the same wavelength of radiation and angle of incidence that is intended to be used in reconstructing the image of the object. The recording medium that is used is, of course, relatively thick and sensitive to this wavelength of radiation.

Next, a second hologram is made with the illustrative apparatus of FIG. 2. This apparatus comprises a source 211 of coherent radiation of a second wavelength, the hologram formed at the first wavelength of radiation, which is shown as element 131, and a second hologram recording medium 231 that is located immediately adjacent hologram 131 in the path of the beam of radiation that is diffracted from hologram 131 when it is illuminated. Typically, hologram 131 is a transmission hologram and recording medium 231 is therefore located immediately behind it as shown in FIG. 2. When hologram 131 is a reflection hologram, medium 231 is located immediately in front of hologram 131. In either case, recording medium 231 is positioned so that it is parallel to hologram 131.

Recording medium 231 can be considerably different from the recording medium in which hologram 131 is recorded. For example, recording medium 231 need not be sensitive to radiation of the wavelength at which hologram 131 was recorded and medium 231 may have other characteristics that make its use as a recording medium especially attractive. Thus, recording medium 231 may permit the recording of a highly efficient hologram that absorbs little or no radiation while recording medium 31 may record only a low efficiency or high-loss hologram.

To form a hologram of the original object in recording medium 231, a beam 216 of radiation from source 211 is directed onto hologram 131 at a median angle $\gamma$ to the normal to hologram 131. Angle $\gamma$ satisfies as much as possible the Bragg relationship among wavelength, angle of illumination, and spacing of the interference fringes that are recorded in the hologram. Specifically, for best results in forming the second hologram, the ratio of the wavelength of the reference beam 16 used in forming the first hologram to the wavelength of the beam 216 that illuminates the first hologram to form the second hologram is approximately equal to the ratio of the sine of the angle at which the reference beam is incident on the first recording medium to the sine of the angle at which the illuminating beam is incident on the first hologram. With reference to the drawing, $\gamma_1\gamma_2 = \sin \beta/\sin \gamma$ where $\gamma_1$ is the wavelength of reference beam 16 and $\mu_2$ is the wavelength of illuminating beam 216.

A portion of beam 216 is diffracted by hologram 131 to reconstruct information beam 222. The remainder of the beam is partly absorbed by hologram 131 and partly transmitted through hologram 131 where it is shown as beam 216'. As a result, two beams of radiation at the second wavelength, beams 216' and 222, are incident on recording medium 231; and because recording medium 231 is parallel to hologram 131, beam 216' is incident on medium 231 at the same angle $\gamma$ it was incident on hologram 131. Because these two beams are derived from the same source 211, they are mutually coherent and interfere to form a set of interference fringes. These fringes are recorded as a second hologram on recording medium 231. This second hologram will be referred to as hologram 331 below. Because recording medium 231 is located immediately adjacent hologram 131, the pattern of the interference fringes is nearly identical to the pattern recorded as hologram 131. The reason for this identity will be more apparent when one recalls that hologram 131 can be regarded as the hologram that would be formed by beams 216' and 222. Consequently, even though the hologram recorded on medium 231 is recorded at a wavelength of radiation different from that used in recording hologram 131, the two holograms have nearly the same fringe spacing and are nearly identical.

Because holograms 131 and 331 are nearly identical, hologram 331 can be viewed without aberrations when it is illuminated with radiation having the same wavelength as that used in forming hologram 131 and the same angle of incidence as reference beam 16. Apparatus for effecting such reconstruction is shown in FIG. 3. This apparatus is comprised of a source 311 of coherent radiation of the same first wavelength used in forming hologram 131 and hologram 331. To reconstruct an image 321 of the object recorded in the interference fringes of hologram 231, beam of coherent radiation 316 is directed from source 311 onto hologram 331. In order to avoid aberrations in the reconstructed image, the median angle between this beam and the normal to hologram 331 is the same as the median angle between beam 16 and the normal to recording medium 31 in FIG. 1 and, therefore, is shown as $\beta$. Beam 316 is diffracted to form a first order reconstructed information beam 322 that reconstructs an image 321 of the original object used in forming hologram 131. Under ideal conditions, reconstructed beam 322 is free of virtually all those aberrations that would otherwise be observed when a hologram formed at one wavelength is reconstructed at another wavelength. In practice, is is possible to approach this condition closely.

An example of experimental use of my invention may help illustrate the applications to which my invention may be put. The first hologram was recorded using an arrangement of apparatus similar to that shown in FIG. 1 where $\beta=30°$. The source of radiation was a helium neon laser that produced a beam of coherent red light at 6,328 A. wavelength and the recording medium was a thick Kodak 649F photographic plate that is sensitive to a wide range of wavelengths of light, including those in the red range. After the hologram was formed, it was placed in apparatus similar to that shown in FIG. 2 at an angle $\gamma$ that satisfied the Bragg condition for the intended wavelength of the illuminating beam. Behind this hologram was placed a second thick hologram recording medium that was comprised of dichromated gelatin. A second hologram was then formed in the dichromated gelatin by illuminating the first hologram with the blue 4,880 A. beam of radiation from an argon laser. As has been noted above, dichromated gelatin has high diffraction efficiency, low absorption loss, and is sensitive only to blue and ultraviolet radiation. Because the blue light from the argon laser is within this range of sensitivity, a hologram was formed in the dichromated gelatin that recorded nearly the same interference pattern as that formed in the Kodak 649F plate. A nearly aberration-free image was then reconstructed at high efficiency and low loss from the hologram recorded in the dichromated gelatin by illuminating this hologram with the red 6,328 A. beam from the helium neon laser at the same angle as the red reference beam was incident on the Kodak 649F plate during formation of the first hologram.

As indicated above, the first hologram that is recorded is a thick hologram. This hologram is thick in order to avoid the reconstruction from the second hologram of a double image that has been reported in the literature. See, for example, G.

C. Sherman, "Hologram Copying by Gabor Holography of Transparencies," Applied Optics, Vol. 6, No. 10, p. 1749 (Oct. 1967). For uses to which I put my invention, namely, the reconstruction of holograms at very high efficiencies, the second hologram should also be a thick hologram because high diffraction efficiency can only be achieved with a thick hologram.

As will be evident to those skilled in the art, my invention is broadly applicable to holography. It may be used wherever it is desired to avoid virtually all the aberrations that would otherwise be created when a hologram formed at one wavelength is illuminated for reconstruction at another wavelength. It is particularly useful in the example I have given where recording media with high diffraction efficiencies and low absorption loss have low sensitivity to radiation at wavelengths longer than approximately 5,500 A. but the most readily available lasers and the most powerful emit radiation at wavelengths longer than approximately 5,500 A.

Numerous applications and modifications within the spirit and scope of my invention will readily be apparent. For example, while I have preferred to place the second hologram-recording medium immediately adjacent the first hologram when recording the second hologram, it is also possible to image the reconstructed beam from the first hologram onto a second recording medium that is not physically near the first hologram. In this case, a lens would be used to image the reconstructed beam onto the second recording medium and a reference beam would be provided at the same angle that the illuminating beam was incident on the first hologram. Still other variations may readily be devised.

What is claimed is:

1. A method for forming a hologram comprising the steps of:

forming a first thick hologram by interfering on a first thick hologram recording medium an information-bearing beam and a reference beam of electromagnetic radiation that is coherent with the information-bearing beam and has a first wavelength and a first angle of incidence on the recording medium;

illuminating the first hologram with a first illuminating beam of electromagnetic radiation having a second wavelength and a second angle of incidence on the first hologram such that the ratio of the wavelength of the reference beam to the wavelength of the illuminating beam is approximately equal to the ratio of the sine of the first angle to the sine of the second angle;

forming on a second recording medium a second hologram of a diffracted portion of the first illuminating beam and a coherent reference beam that is incident on the second recording medium at the same angle as the first illuminating beam is incident on the first hologram; and illuminating the second hologram with a second illuminating beam at approximately the same first wavelength and first angle of incidence to reconstruct the information-bearing beam in the first order with a minimum of the aberrations that would otherwise be found in a wave front reconstructed from a hologram that is illuminated with a beam of radiation that is different in wavelength and angle of incidence on the hologram from the wavelength and angle of incidence of a reference beam used in forming the hologram.

2. The method of claim 1 wherein the first recording medium is sensitive to radiation having a wavelength longer than 5,500 A., the second recording medium is sensitive to radiation shorter than 5,500 A. and the second wavelength is shorter than 5,500 A.

3. The method of claim 1 wherein the second recording medium is sufficiently thick that the second hologram is a thick hologram.

4. The method of claim 3 wherein the second recording medium is dichromated gelatin.

5. The method of claim 1 wherein the second recording medium is located immediately adjacent the first hologram and parallel to it and the second hologram is formed from the diffracted and undiffracted portions of the beam that illuminates the first hologram.

* * * * *